Nov. 15, 1960  C. W. KANDLE  2,960,312
DRILL CUTTING HEAD
Filed June 7, 1957

INVENTOR.
CHARLES W. KANDLE
BY
Andrus, Sceales & Starke
Attorneys

2,960,312
DRILL CUTTING HEAD

Charles W. Kandle, 1420 Robinhood Lane,
La Grange Park, Ill.

Filed June 7, 1957, Ser. No. 664,249

1 Claim. (Cl. 255—61)

This invention relates to a boring drill and more particularly to a cutting head for a drill adapted for boring through hard formations such as limestone, shale and soft grades of rock.

The present invention is directed to a cutting head for a boring drill wherein the shank carries a plurality of cutting bits disposed in a plurality of radially spaced annular tiers concentrically of the shank and with succeeding tiers of cutting bits from the innermost tier outwardly being spaced axially rearward from the next adjacent inner tier. The invention provides a cutting head adapted to cut on rearwardly stepped parallel planes perpendicular to the axis of the shank.

The drawings furnished herewith illustrate the best mode of carrying out the invention as presently contemplated and set forth hereinafter.

Figure 1:
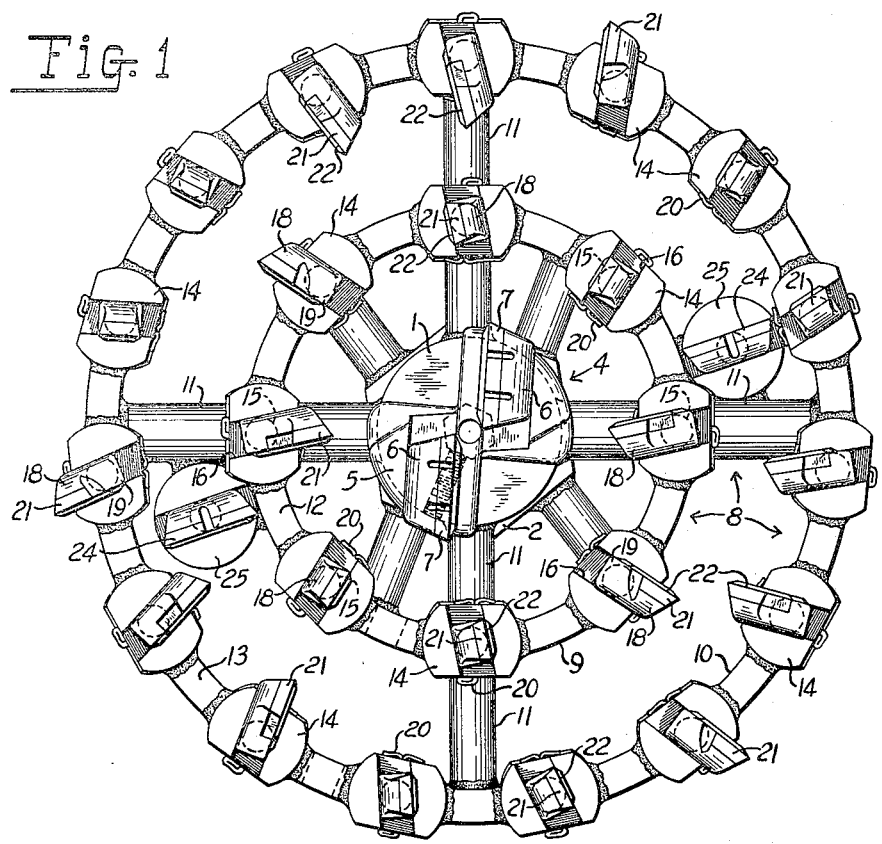
Figure 1 is an end view of the cutting head of this invention.

Referring to the drawings, the cutting head of this invention includes an axially extending shank 1 having a rearward portion 2 adapted to be received within a hollow rotatable drill shaft, not shown. The rearward portion 2 of the shank 1 is provided with one or more radially extending openings 3 which are adapted to be aligned with corresponding openings in the drill shaft, not shown, to receive pins or the like, not shown, to removably secure the shank to the drill shaft.

Forwardly, the shank 1 carries a pilot cutter 4 comprising a multiple socket member 5 adapted to removably receive a pair of diametrically opposed cutting members 6. Each of the cutting members 6 is provided with a cutting bit 7 offset a relatively small amount from a diametral line through the axis of the shank and substantially parallel thereto, and is adapted to cut on a lead plane perpendicular to the axis of the shank.

The shank 1 carries a spider framework 8 including the inner annular member 9 and the outer annular member 10 spaced concentrically from the shank and from each other by means of the radial bracing elements 11. The forward or leading end 12 of annular member 9 is axially offset rearwardly from the cutting plane of the pilot cutter 4 and the forward or leading end 13 of annular member 10 is similarly offset from the leading end 12 of member 9.

The inner annular member 9 of framework 8 carries a plurality of spaced socket members 14, each of which is provided with an axially extending socket opening 15. A slot 16 extends across the forward face of each socket member 14 and intercepts the end of opening 15. The socket opening 15 provided in each socket member 14 is adapted to receive the rearwardly extending shank portion 17 of a cutter member 18. Each cutter member 18 includes a body portion 19 which is adapted to seat within slot 16 to secure the cutter member against rotation. A pin member 20, such as a cotter key or the like, extends through radially aligned openings in the socket member 14 and shank portion 17 to removably secure the cutter member 18 within the socket member.

Each cutter member 18 includes a bit 21 secured within body portion 19 and having a cutting edge 22 disposed generally forwardly in the direction of drilling. The arrangement of each cutter member 18 together with its socket member 14 is such as to provide each bit 21 with a side rake to direct the spoil inwardly for removal by drill flights, not shown, carried by the drill shaft. Bits 21 of the respective members 18 carried by annular member 9 are adapted to cut an annular band or tier on a plane perpendicular to the axis of shank 1 and parallel to and rearwardly offset from the cutting plane of pilot cutter 4.

The cutter members 18 carried by member 9 are arranged in segmental groups within which the bits 21 are carried in radially offset relation with respect to each other so as to cut a wider band or tier. The body portions 19 including bits 21 are offset with respect to each other from a radially inward position within each group to a radially outward position in the direction of their rotation for drilling with the innermost bit being spaced radially outward from the path of cutting bits 7 carried by the pilot cutter 4. Thus, the cutters 18 carried by annular member 9 cut a band of material in the plane of their cutting bits 21 and the narrow band of material spaced between the respective paths of bits 7 and 21 simply disintegrates upon forward movement of the tool.

The outer annular member 10 provided on framework 8 also carries a plurality of spaced socket members 14 in the leading end 13 thereof. Each of the socket members 14 carries a cutter member 18 including bits 21 so as to provide the bits with a side rake and direct the spoil inwardly. Bits 21 carried by annular member 10 are adapted to cut an annular band on a plane perpendicular to the axis of shank 1 and parallel to the cutting planes of pilot cutter 4 and annular member 9 and offset rearwardly from the cutting plane of annular member 9.

Like the cutter members 18 carried by the annular member 9, the cutter members 18 on annular member 10 are arranged in segmental groups within which the body portions 19 carry the bits 21 in radially offset relation with respect to each other. Within each group of cutter members 18, succeeding bits 21 are progressively offset radially outward in the direction of drill rotation. The innermost of the bits 21 carried by annular member 10 are spaced radially from the outermost of the bits 21 carried by annular member 9 so that the remaining band of uncut material between the cutters carried by annular members 9 and 10 is so narrow, and consequently fragile, that it simply disintegrates by forward movement of the tool.

Figure 2:
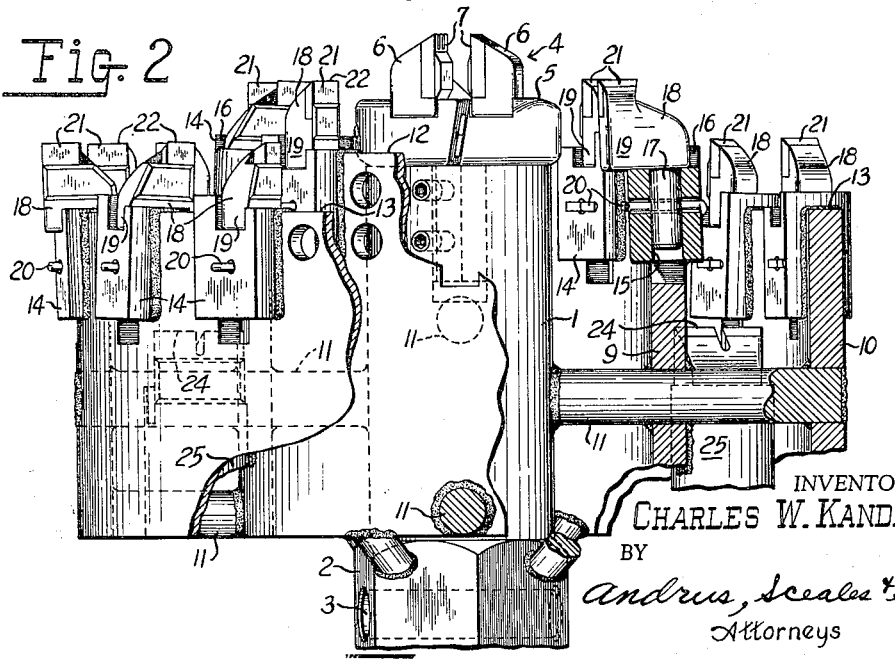
Figure 2 is a side elevation of the cutting head with parts broken away and sectioned.

Where, due to the size of the hole being drilled, it becomes necessary to space the outer ring 10 a considerable radial distance from ring 9, it is advisable to employ auxiliary cutters 24 which are located in diametrically spaced relation and beneath cutters 21, in the direction of cut, as shown in Fig. 2. Cutters 24 are mounted in the tubular supports 25 which are welded to ring 9 and the radial brace elements 11 and on the leading side of the latter. The cutters 24 are of the double cutting edge type, which are of greater width than the other cutters.

These auxiliary cutters serve to positively cut the remaining band of material which is otherwise left between the cutters on rings 9 and 10.

By means of this invention there has been provided a particularly efficient drill head for cutting limestone, shale and soft grades of rock.

Various modes of carrying out the invention are contemplated as being within the scope of the following claim particularly pointing out and distinctly claiming the subject matter which is regarded as the invention.

I claim:

A drill cutting head in which a spider frame having concentric circumferential members secured by radial members to a rotary shank carries a plurality of individual cutting teeth mounted on said circumferential members in advance of the frame to provide a plurality of radially spaced substantially concentrically disposed tiers of circumferentially spaced cutter mountings, the construction in which the cutter teeth in each tier are arranged in groups of successive teeth disposed in radially offset relation to cut in different adjacent circumferential paths, the groups comprising individual teeth having forwardly facing cutting edges of different width whereby the band of cut for each tier is of substantially greater radial extent than the supporting frame member therefor and leaves only a narrow ridge of easily broken uncut material between it and any adjacent tier spaced radially therefrom, and in which additional teeth are carried by at least one said radial frame member intermediate adjacent tiers to radially overlap the bands of cut of said adjacent tiers.

References Cited in the file of this patent

UNITED STATES PATENTS

| | | |
|---|---|---|
| 1,805,898 | Wright et al. | May 19, 1931 |
| 2,575,975 | Robbins | Nov. 20, 1951 |
| 2,699,328 | Alspaugh et al. | Jan. 11, 1955 |
| 2,749,102 | Goodrich | June 5, 1956 |

FOREIGN PATENTS

| | | |
|---|---|---|
| 914,723 | Germany | July 8, 1954 |